US011872643B2

(12) United States Patent
Nagata et al.

(10) Patent No.: US 11,872,643 B2
(45) Date of Patent: Jan. 16, 2024

(54) T-SHAPED TOOL, AND METHOD FOR MANUFACTURING T-SHAPED TOOL

(71) Applicant: MAKINO MILLING MACHINE CO., LTD., Tokyo (JP)

(72) Inventors: Fukuhito Nagata, Fujiyoshidai (JP); Ryoichi Miyamoto, Fujiyoshidai (JP); Hiroshi Ueno, Fujiyoshidai (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 16 days.

(21) Appl. No.: 17/606,520

(22) PCT Filed: Apr. 24, 2020

(86) PCT No.: PCT/JP2020/017796
§ 371 (c)(1),
(2) Date: Oct. 26, 2021

(87) PCT Pub. No.: WO2020/218556
PCT Pub. Date: Oct. 29, 2020

(65) Prior Publication Data
US 2022/0203463 A1 Jun. 30, 2022

(30) Foreign Application Priority Data
Apr. 26, 2019 (JP) ................. 2019-086539

(51) Int. Cl.
*B23C 5/10* (2006.01)
(52) U.S. Cl.
CPC ........ *B23C 5/1063* (2013.01); *B23C 2210/02* (2013.01); *B23C 2210/03* (2013.01); *B23C 2240/32* (2013.01); *B23C 2250/12* (2013.01)

(58) Field of Classification Search
CPC ........... B23C 2240/32; B23C 2240/24; B23C 2240/00; B23C 5/1072; B23C 5/1063;
(Continued)

(56) References Cited

U.S. PATENT DOCUMENTS

| 2001/0041106 A1 | 11/2001 | Nagaya et al. |
| 2003/0143044 A1 | 7/2003 | Rothenstein |

(Continued)

FOREIGN PATENT DOCUMENTS

| CN | 201470964 U | 5/2010 |
| DE | 202017107139 U1 | 2/2019 |

(Continued)

OTHER PUBLICATIONS

International Search Report for PCT/JP2020/017796 (dated Jul. 7, 2020).

*Primary Examiner* — Alan Snyder
(74) *Attorney, Agent, or Firm* — Merchant & Gould P.C.

(57) ABSTRACT

In a T-shaped tool (10) in which a head (30) having cutting edges (36, 38) and a cylindrical shank (20) are fastened together: the shank comprises a super-hard alloy, and an engaging portion which engages with a tool main body is formed in a distal end portion thereof; the tool main body comprises a steel material, and an engaged portion which engages with the engaging portion of the shank is formed therein; and the engaging portion and the engaged portion are fastened in such a way as to be retained and prevented from rotating.

2 Claims, 12 Drawing Sheets

(58) Field of Classification Search
CPC .............. B23C 5/1054; B23C 2210/02; B23C 2210/03
See application file for complete search history.

(56) References Cited

U.S. PATENT DOCUMENTS

| | | |
|---|---|---|
| 2008/0304923 A1 | 12/2008 | Lehto et al. |
| 2009/0010709 A1* | 1/2009 | Berglow ................ B23B 31/11 408/233 |
| 2012/0039676 A1 | 2/2012 | Marshansky |
| 2014/0227057 A1 | 8/2014 | Haimer et al. |
| 2015/0003922 A1 | 1/2015 | Orlov |
| 2015/0147128 A1 | 5/2015 | Saji |

FOREIGN PATENT DOCUMENTS

| | | | |
|---|---|---|---|
| EP | 3170598 A1 | 5/2017 | |
| GB | 2545333 A * | 6/2017 | ............ B23B 51/02 |
| JP | H9-248709 A | 9/1997 | |
| JP | 2001-225211 A | 8/2001 | |
| JP | 2003-525137 A | 8/2003 | |
| JP | 2013-10177 A | 1/2013 | |
| JP | 2013-534189 A | 9/2013 | |
| WO | 2013/180144 A1 | 12/2013 | |

* cited by examiner

T-SHAPED TOOL, AND METHOD FOR MANUFACTURING T-SHAPED TOOL

This application is a National Stage Application of PCT/JP2020/017796 filed Apr. 24, 2020, which claims benefit of priority to Japanese Patent Application No. 2019-086539, filed Apr. 26, 2019, which applications are incorporated herein by reference. To the extent appropriate, a claim of priority is made to each of the above disclosed applications.

FIELD

The present invention relates to a T-shaped tool, such as a T-groove milling cutter, a dovetail milling cutter, or a Christmas tree milling cutter in which a tool body having a cutting edge and a cylindrical shank are fastened in a substantially T shape in a side view, and a method for manufacturing the same.

BACKGROUND

T-shaped tools having a shank and a head (tool body) joined to a tip of the shank have conventionally been known. For example, Patent Literature 1 describes a T-shaped tool (T-groove milling cutter) in which a cutting head having a cutting edge arranged on an outer periphery thereof is detachably attached to the distal end of a shank using a spline fitting and a screw. The cutting head has an annular protrusion in a central part of an end surface facing the shank, a spline hole inside the protrusion is engaged with a spline shaft formed at a distal end of the shank, the end surface of the annular protrusion is brought into contact with the end surface of the shank, and an affixation screw is inserted from the other end surface of the cutting head into a head hole formed in the center of the cutting head and screwed into a female thread formed at the end of the shank, whereby the cutting head and shank are aligned and detachably joined.

CITATION LIST

Patent Literature

[PTL 1] Japanese Unexamined PCT Publication (Kohyo) No. 2013-534189

SUMMARY

Technical Problem

In the T-shaped tool described in Patent Literature 1, the shank is pulled by the affixation screw in a state in which it is in contact with the end surface of the protrusion of the cutting head. Since the cutting head and the shank are detachable, first, the fastening rigidity between the cutting head and the shank becomes low, and there is a risk of loosening of the cutting head and the shank due to insufficient tightening force of the affixation screw. Machining the spline shaft and spline hole so as to impart a centering function requires a highly difficult machining technique, and even if a centering function is provided, there is a problem in that centering errors which occur with each attachment or detachment are inevitable.

Thus, the present invention aims to solve such problems of the prior art, and to provide a T-shaped tool which is easy to manufacture, which has high rigidity, high precision, and which is safer.

Solution to Problem

In order to achieve the object described above, according to the present invention, there is provided a T-shaped tool in which a tool body having a cutting edge and a cylindrical shank are fastened in a T shape in a side view, wherein the shank is composed of a cemented carbide and has an engagement part which engages with the tool body on a distal end thereof, the tool body is composed of a steel material and has an engaged part which engages with the engagement part of the shank, and the engagement part and the engaged part are fastened so as not to disengage and rotate.

Furthermore, according to the present invention, there is provided a method for manufacturing a T-shaped tool in which a tool body having a cutting edge and a cylindrical shank are fastened in a T shape, the method comprising the steps of forming an engagement part which engages with the tool body on a distal end of the shank, which is composed of a cemented carbide, forming an engaged part which engages with the engagement part of the shank on the tool body, which is composed of a steel material, fastening the engagement part and the engaged part so as to not disengage and rotate, screwing a weight into a screw hole formed in an end surface of the tool body to rotationally balance the T-shaped too, and attaching a cover to the end surface of the tool body.

Advantageous Effects of Invention

According to the present invention, since the tool body, which has a cutting edge and which is formed from a steel material, and the cylindrical shank, which is formed from a cemented carbide, are fastened so as not to disengage and rotate by the engagement between the engagement part of the shank and the engaged part of the tool body, rotation or separation of the tool body with respect to the shank is prevented. In this manner, cemented carbide, which has a high rigidity, can be used for shank, and the rigidity of the fastening part between the shank and the tool body is also high, whereby machining speed (cutting speed) can be increased and machining efficiency can be improved. Furthermore, by forming the shank from cemented carbide, the shank is less likely to become deformed, whereby machining accuracy can be improved. Since there is no attachment or detachment of the shank and the tool body after the shank and the tool body have been fastened to produce the T-shaped tool, the present invention can be used as a T-shaped tool as if the shank and the tool body had been formed in a monolithic structure.

DESCRIPTION OF EMBODIMENTS

Preferred embodiments of the present invention will be described below with reference to the attached drawings.

The T-shaped tool 10 comprises a shank 20 attached to a spindle of a machine tool or the distal end of a tool holder, and a head (tool body) 30 joined to the tip of the shank 20. The shank 20 is composed of, for example, a highly-rigid cemented carbide rod-shaped member having a substantially cylindrical shape, and a male thread 24 is formed on the distal end thereof. The male thread 24 can be, for example, a thread having a pitch of 1 to 2 mm and a thread height of 0.5 to 2 mm. The shank 20 can be formed so that two flat surfaces 28 are radially opposed to each other on the side surface thereof. The flat surfaces 28 can be used for mating the shank 20 with the head 30 using a tool such as a wrench.

A coolant passage for supplying coolant to the cutting edge can be formed in the shank 20. The coolant passage can include an axial passage 26 which penetrates the shank 20 along the central axis O and radial passages (not illustrated) which radially penetrate the shank 20 from the axial passage 26. When the shank 20 is fastened to the head 30, the radial passages communicate with three passages (not illustrated) opened in the radial direction of the head 30 and open into first grooves 32.

Figure 1:
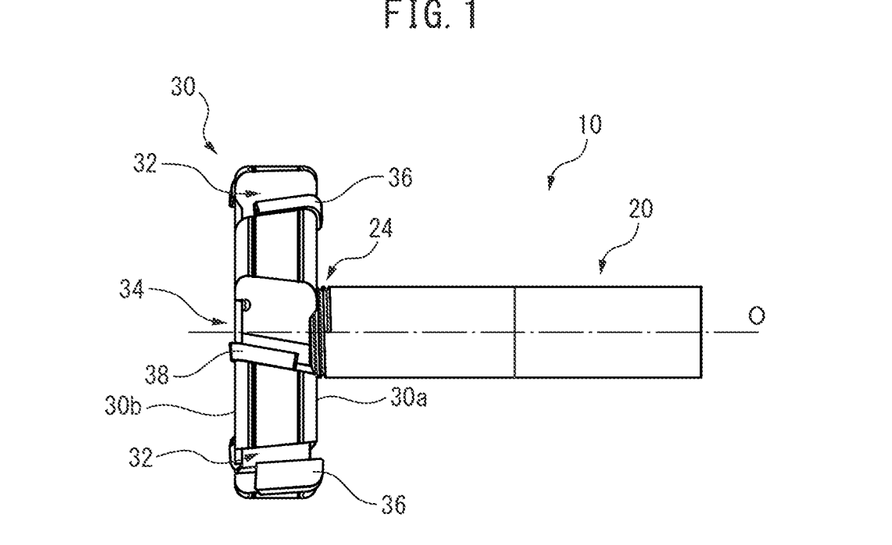
FIG. 1 is a side view of a T-shaped tool according to a preferred embodiment of the present invention.
Figure 2:
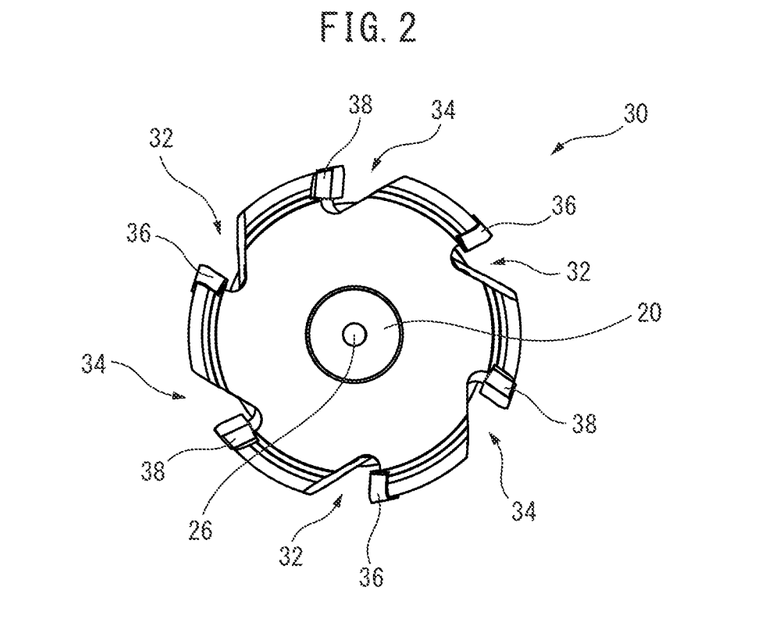
FIG. 2 is a plan view of the T-shaped tool of FIG. 1 viewed from the shank side.

The head 30 forms the tool body of the T-shaped tool 10, and can be formed from, for example, a steel material. A plurality of cutting edges, six cutting edges in the present embodiment, are formed on the head 30. In the present embodiment, the cutting edges are formed from inserts 36, 38 attached to the head 30. The inserts 36, 38 can be formed from, for example, a highly wear-resistant cemented carbide. The inserts 36, 38 include three upper inserts 36 protruding toward a base end side of the T-shaped tool 10, i.e., the shank 20 side, and three lower inserts 38 protruding toward a tip side of the T-shaped tool 10, i.e., the side opposite the shank 20.

A plurality of grooves 32, 34, six in the present embodiment, corresponding to the number of inserts 36, 38 are formed in the head 30. The grooves 32, 34 extend from a proximal end face 30a of the head 30 facing the shank 20 to a distal end face 30b facing the side opposite the shank 20. The grooves 32, 34 include first grooves 32 which accept the upper inserts 36 and second grooves 34 which accept the lower inserts 38. The first and second grooves 32, 34 can each include an upper seat (not illustrated) for attachment of an upper insert 36 or a lower seat (not illustrated) for attachment of a lower insert 38. In the present embodiment, the upper inserts 36 and the lower inserts 38 are affixed to the upper seats 32a and the lower seats 34a by brazing.

Furthermore, the upper inserts 36 and the lower inserts 38 can be formed in the same shape. The upper inserts 36 each can have a linearly extending main cutting edge and an arcuate secondary cutting edge connected to the main cutting edge at the upper end of the upper insert 36. The shape and dimensions of the arcuate secondary cutting edge can be determined in accordance with the size of the fillet R on the surface to be machined of the workpiece. Each upper insert 36 is attached to the corresponding upper seat so that the main cutting edge protrudes from the outer peripheral surface of the head 30 and the secondary cutting edge protrudes from the proximal end face 30a of the head 30. Likewise, each lower insert 38 is attached to the corresponding lower seat so that the linear main cutting edge protrudes from the outer peripheral surface of the head 30 and the arcuate secondary cutting edge protrudes from the distal end face 30b of the head 30.

Furthermore, the upper insert 36 is fixed to the upper seat 32a so that its rake face faces downward. That is, the upper insert 36 is inclined with respect to the head 30 so that the rake face of the upper insert 36 can be seen when the T-shaped tool 10 is viewed from the distal end face 30b side. Similarly, the lower insert 38 is fixed to the lower seat so that its rake face faces downward. Specifically, the lower insert 38 is inclined with respect to the head 30 so that the rake face of the lower insert 38 can be seen when the T-shaped tool 10 is viewed from the proximal end face 30a (shank 20) side.

A central opening having a female thread 50 which engages with the male thread 24 of the shank 20 is further formed in the head 30 in a central part thereof. The head 30 is fastened to the shank 20 by engaging the male thread 24 of the shank 20 with the female thread 50 of the central opening of the head 30. A plurality of screw holes 42, 44 may be formed in the distal end face 30b of the head 30, and screws (not illustrated) as weights for balancing the rotation of the T-shaped tool 10 may be attached thereto. In the present embodiment, the screw holes 42 are smaller than the screw holes 44, i.e., are adapted for the affixation of lighter screws. The small diameter screw holes 42 are for precision rotation balance, and the large diameter screw holes 44 are for coarse rotation balance. Further, the screw holes 42, 44 are arranged at equal intervals on the circumference, the screw holes 42 may be arranged on a circumference having a diameter smaller than that of the screw holes 44, may be arranged on a circumference having a large diameter, or may be arranged alternately on a circumference having the same diameter. Since rotation balancing can be performed near the machining operation point of the T-shaped tool, vibration of the T-shaped tool due to imbalance is small.

Figure 3:
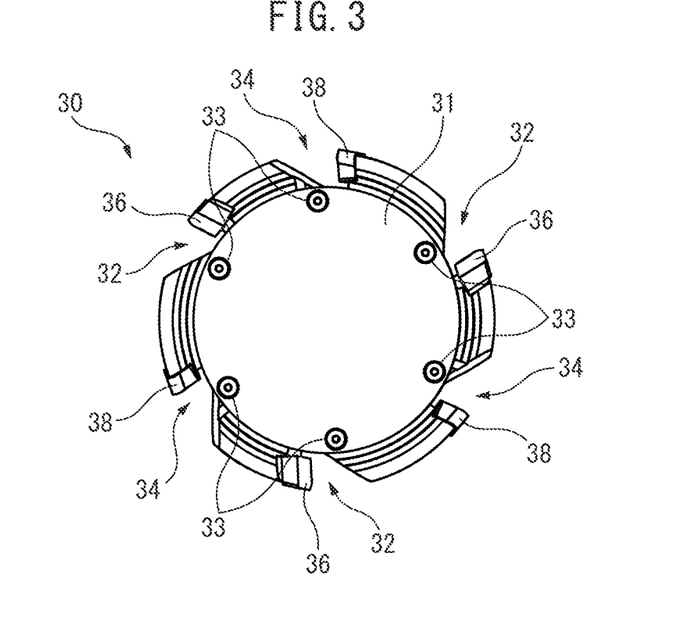
FIG. 3 is a bottom view of the T-shaped tool of FIG. 1 viewed from the tip side.
Figure 4:
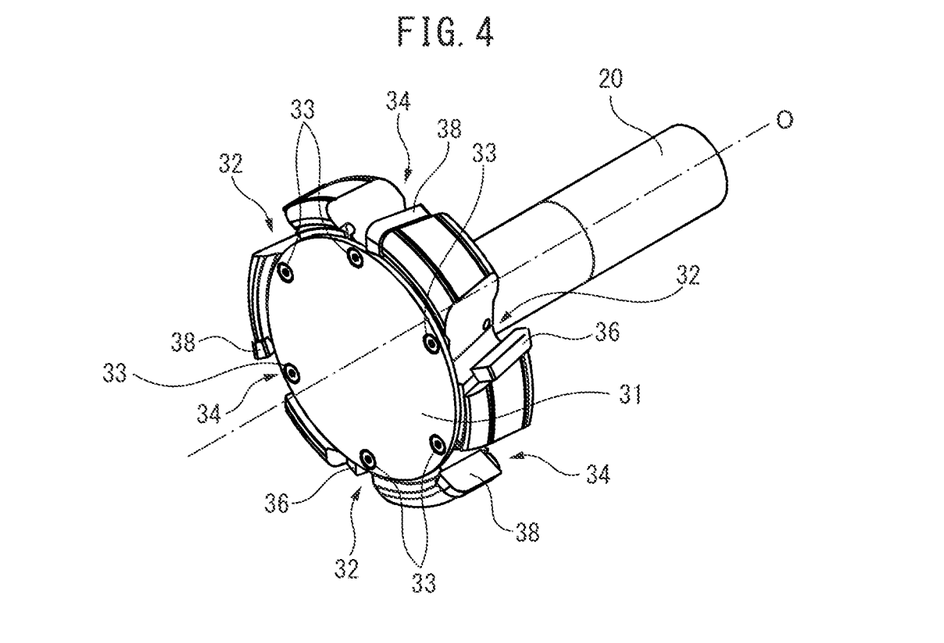
FIG. 4 is a perspective view of the T-shaped tool of FIG. 1.

Furthermore, as shown in FIGS. 3 and 4, the distal end face 30b of the head 30 can be covered by a circular thin-plate cover 31. The cover 31 is affixed to the distal end face 30b of the head 30 by a plurality of screws 33. By covering the distal end face 30b of the head 30 with the cover 31, not only is the aesthetic appearance of the T-shaped tool 10 improved, but also swarf generated during the use of the T-shaped tool 10 is prevented from entering the screw holes 42, 44.

Furthermore, in order to prevent the fastening between the female thread 50 of the head 30 and the male thread 24 of the shank 20 from loosening due to vibration or the like generated during cutting using the T-shaped tool 10, a detent for the head 30 relative to the shank 20 can be applied.

Figure 5:
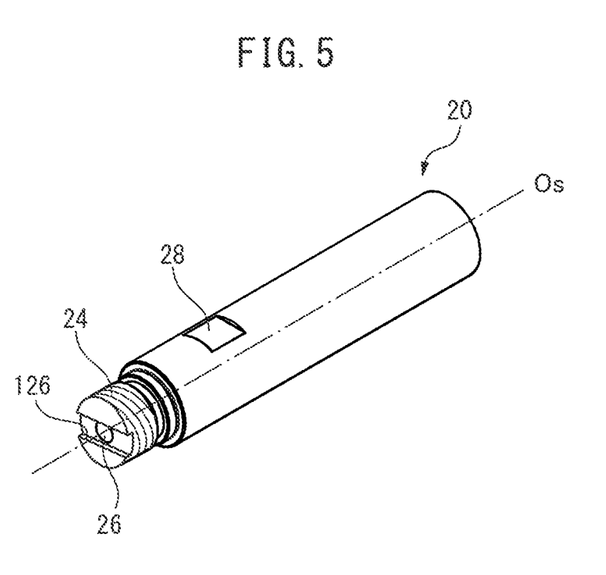
FIG. 5 is a perspective view showing an example of a shank of the T-shaped tool of FIG. 1.
Figure 6:
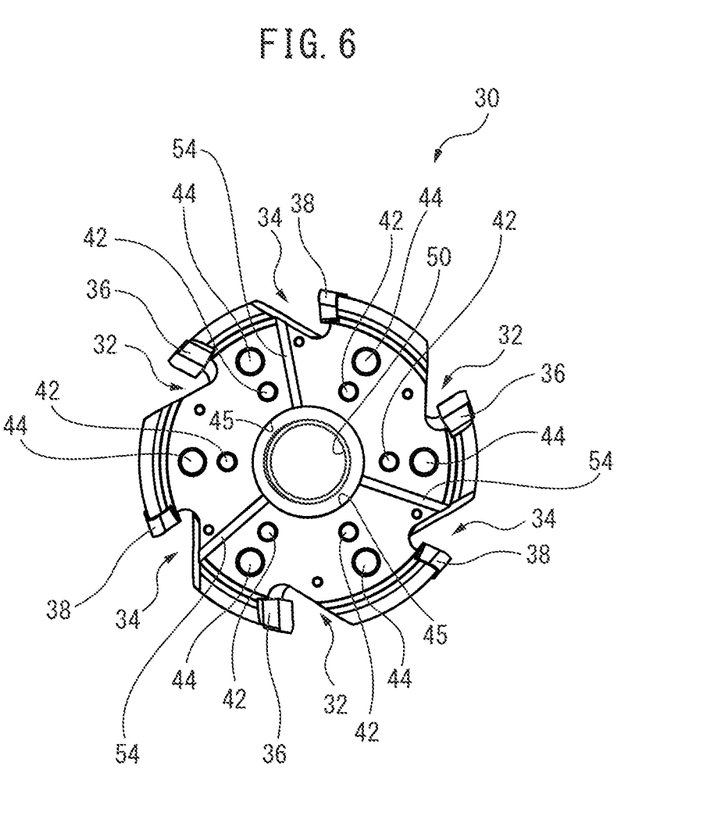
FIG. 6 is a bottom view showing an example of a head of the T-shaped tool of FIG. 1 in which the cover is removed.
Figure 7:
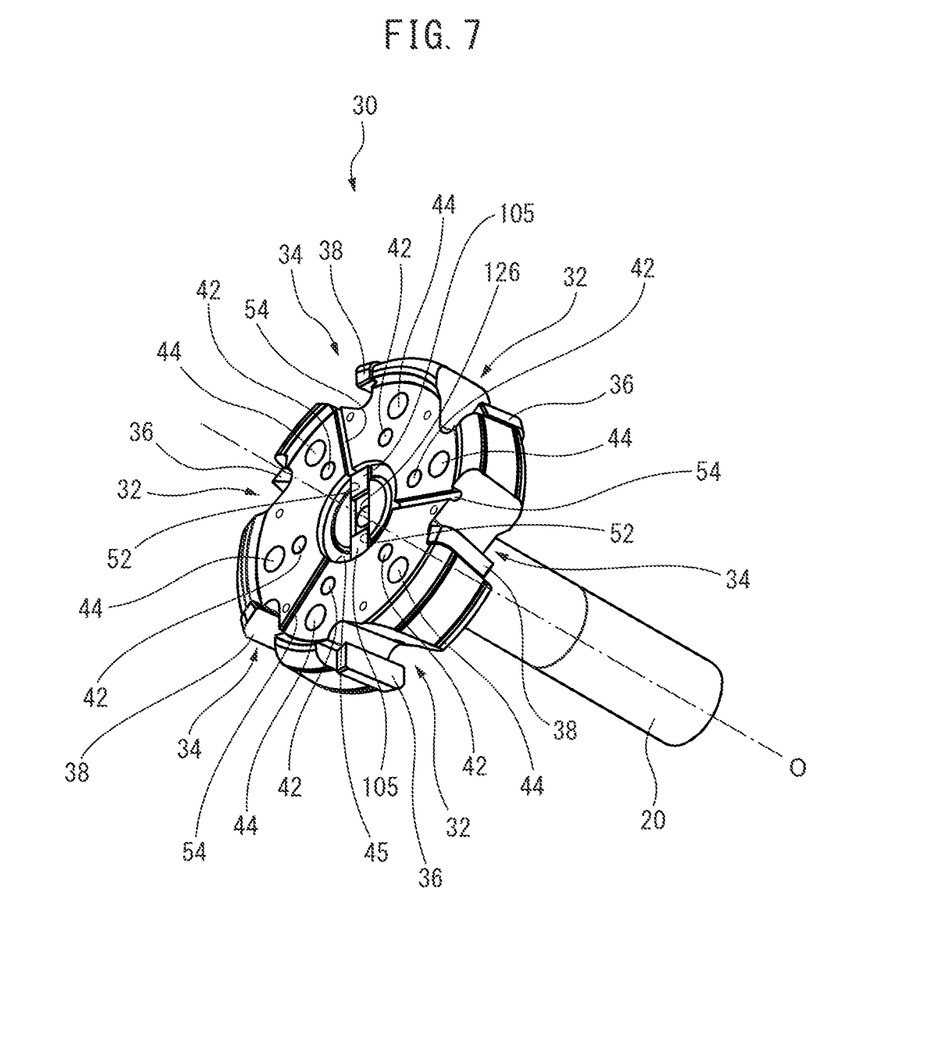
FIG. 7 is a perspective view of a T-shaped tool in which the shank of FIG. 5 and the head of FIG. 6 are fastened.

A rectangular key can be used as the detent for the head 30 relative to the shank 20. Referring to FIGS. 5 to 7, one rectangular recess 126 extending in the radial direction on the distal end face is formed in the shank 20 as a key groove. A circular recess 45 recessed by the thickness dimension of the key 105 is formed in the distal end face 30b of the head 30. The recess 45 is arranged concentrically with the female thread 50. When the shank 20 and the head 30 are fully engaged, the rectangular plate-shaped keys 105 are fitted in both ends of the recess 126. The keys 105 are fitted into the recess 126 so that a portion of each key protrudes into the recess 45. The protruding portions of the keys 105 are welded to the recess 45 of the head 30. Since both the keys 105 and the head 30 are made of a steel material, welding can easily be performed. Since the shank 20, which is composed of cemented carbide, is not welded, there are no disadvantages such as the cemented carbide becoming cracked due to welding heat.

The head 30 further has three radial grooves 54 extending radially from the recess 45 along the distal end face 30b of the head 30 to the grooves 34. The radial grooves 54 form radial passages for the cutting fluid, and direct cutting fluid from the axial passage 26 penetrating the shank 20 toward the second grooves 34 when the cover 31 covers the distal end face 30b of the head 30. Though it is difficult to form a radial passage inside the head 30, groove machining is easy.

Furthermore, after the head 30 is joined with the shank 20, the T-shaped tool 10 can be finished by grinding so that the main cutting edges and the secondary cutting edges of the upper inserts 36 and the lower inserts 38 have desired dimensions, shapes, and postures relative to the shank 20. Furthermore, after the head 30 is joined with the shank 20, it is preferable to appropriately engage screws into the screw holes 42, 44 to adjust the rotation balance of the T-shaped tool 10.

Figure 8:
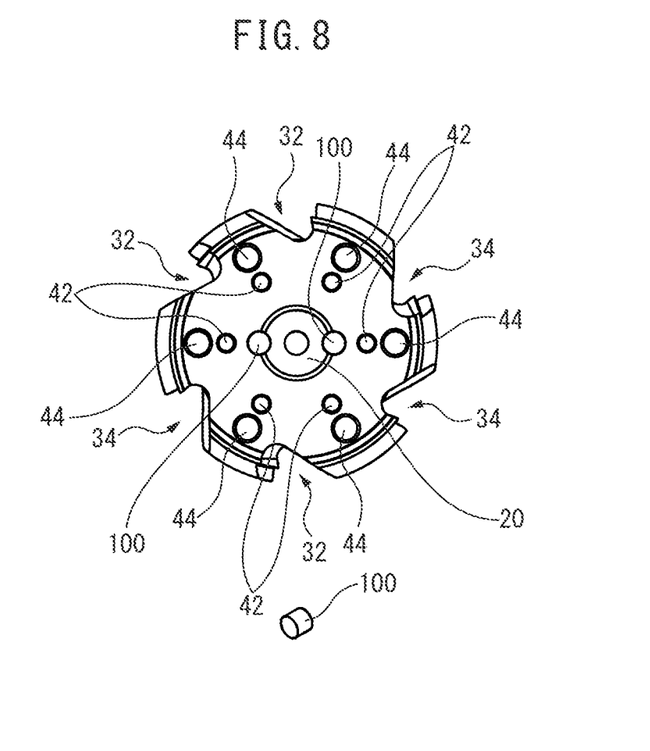
FIG. 8 is a bottom view showing another example of a fastening part of the T-shaped tool.

Referring to FIG. 8, as an example of the detent, an embodiment in which columnar keys 100 are inserted and welded between the shank 20 and the head 30 is shown. In this embodiment, the recess 126 is not formed in advance in the distal end face of the shank 20. When the shank 20 and the head 30 are fully engaged, as shown in FIG. 8, two circular holes are formed at the boundary between the shank 20 and the head 30 by electric discharge machining or grinding so that two columnar keys 100 can be fitted. A key 100 is fitted into each circular hole, and the portions of the keys 100 on the head 30 side are welded to the distal end face 30b. Brazing may be used in place of welding.

Figure 9:
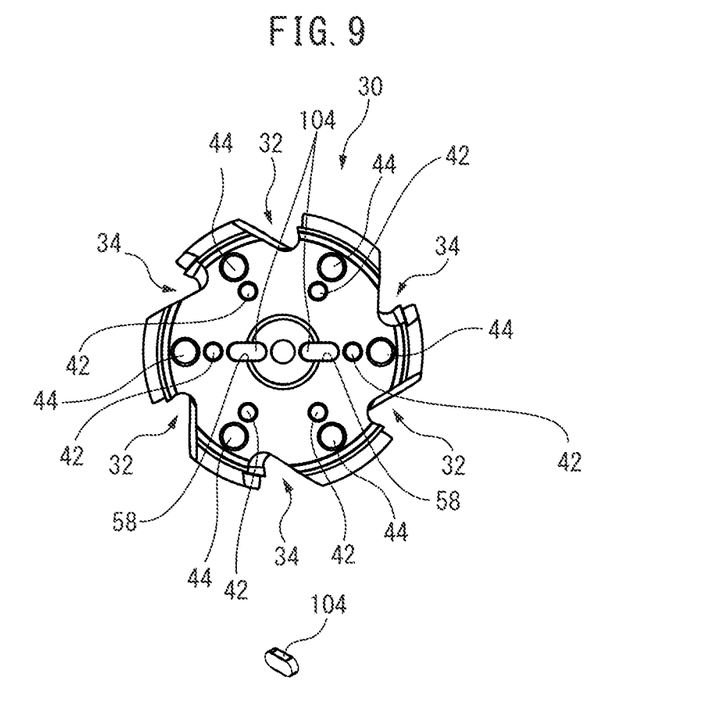
FIG. 9 is a bottom view showing another example of a fastening part of the T-shaped tool.

In the present invention, the detent of the head 30 with respect to the shank 20 is not limited to the columnar key 100 described above, and may have other shapes. For example, in the embodiment shown in FIG. 9, the detent of the head 30 with respect to the shank 20 comprises oval keys 104. In this embodiment, two oval notches are machined at the boundary between the shank 20 and the head 30 by electric discharge machining or the like. An oval key 104 is fitted into each of the two notches from the shank 20 to the head 30, and the portion of the key 104 on the head 30 side is welded to the distal end face 30b.

Figure 10:
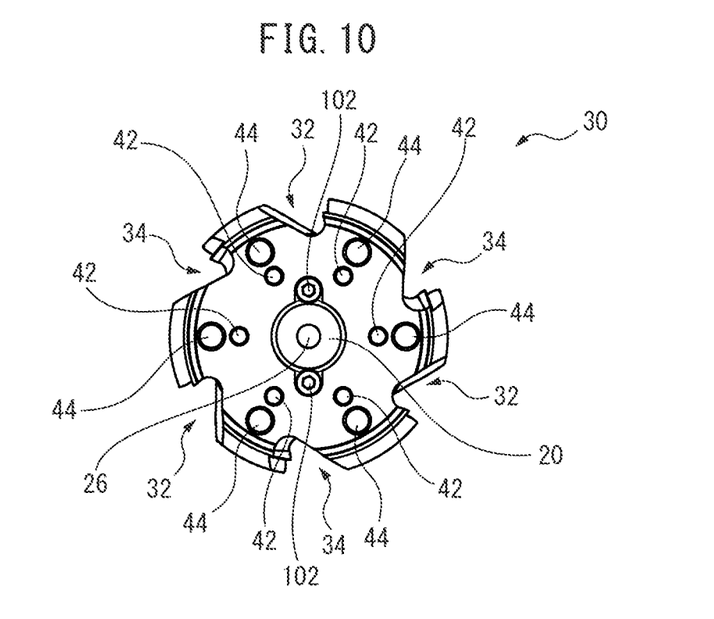
FIG. 10 is a bottom view showing another example of fastening of the T-shaped tool.

Further, the keys as the detent of the head 30 with respect to the shank 20 are not limited to being affixed to the head 30 by welding. For example, in the embodiment shown in FIG. 10, the keys as the detent of the head 30 with respect to the shank 20 are composed of hexagonal socket head cap bolts 102. In the present example, screw holes and counterbores for screwing the hexagonal socket head cap bolts 102 are machined in advance at the two positions of the head 30 shown in FIG. 10. When the shank 20 and the head 30 are fully engaged, portions of the counterbores are machined into the distal end face position of the shank 20 corresponding to the counterbores of the head by electric discharge machining or the like. Then, the detent is constructed by screwing the hexagonal socket head cap bolts 102 into the two counterbores and the screw holes.

Figure 11:
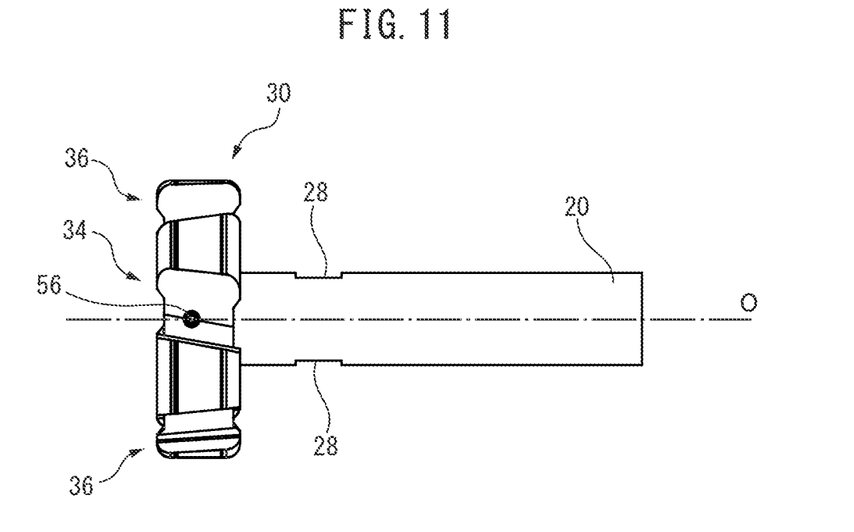
FIG. 11 is a side view showing another example of fastening of the T-shaped tool.

The detent of the head 30 with respect to the shank 20 may be such that a set screw is radially engaged with the side surface of the threaded portion (male thread 24) of the shank 20 from the head 30. Referring to FIG. 11, a screw hole is formed in the second groove 34 of the head 30 so as to extend to the central opening in the radial direction. When the shank 20 and the head 30 are fully engaged, a shallow hole concentric with the screw hole is machined in the radial direction of the shank 20 by electric discharge machining. The set screw 56 is then screwed into this screw hole so that the set screw 56 is thrust into the shallow hole of the shank 20. After applying an anti-loosening agent to the threaded portion of the set screw 56 or screwing the set screw 56, anti-loosening measures such as filling the screw hole with brazing are performed.

In the embodiments described above, the male thread 24 formed at the distal end of the shank 20 is engaged into the female thread 50 of the central opening formed in the central part of the head 30. However, the present invention is not limited thereto, and other embodiments in which a female thread is formed on the distal end of the shank 20 and a male thread is formed on the proximal end surface 30a of the head 30 may be adopted.

Figure 12:
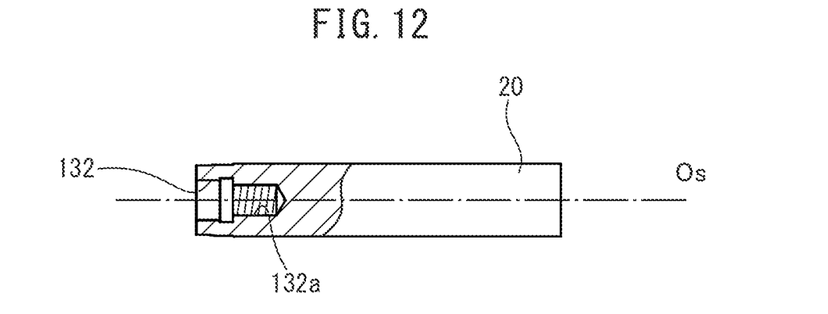
FIG. 12 is a partial longitudinal sectional view of a shank of a T-shaped tool according to another embodiment of the present invention.
Figure 13:
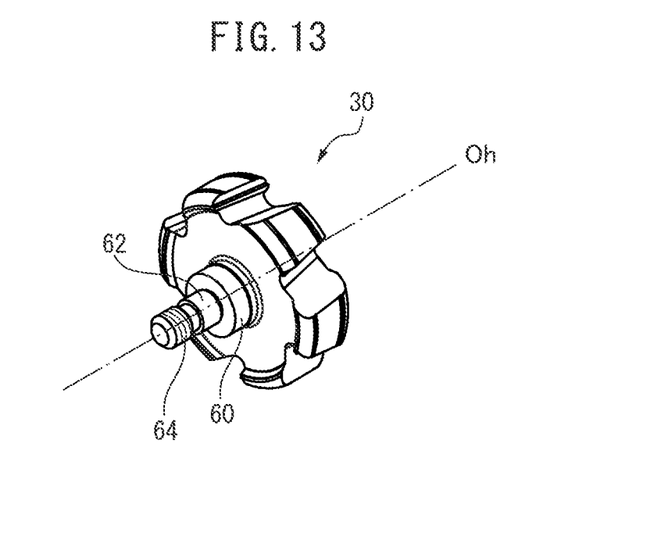
FIG. 13 is a perspective view of a head to be fastened to the shank of FIG. 12.
Figure 14:
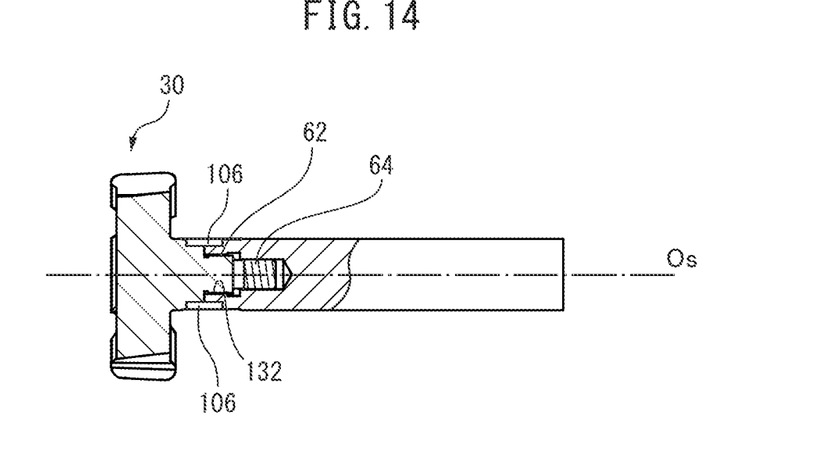
FIG. 14 is a partial longitudinal sectional view of a T-shaped tool in which the shank of FIG. 12 and the head of FIG. 13 are fastened.

Referring to FIGS. 12 to 14, the shank 20 of another embodiment has a fitting hole 132 formed in a distal end thereof. The fitting hole 132 is formed along the central axis Os of the shank 70 and has a threaded portion 132a in which a female thread is formed on the bottom side of the fitting hole 132. The head 30 has a boss 60 projecting from a central part of the proximal end face 30a and a shaft further projecting from the boss 60. The shaft has a fitting 62 adjacent to the boss 60 and a threaded part 64 composed of male threads protruding further rearward from the fitting 62. The boss 60, the fitting 62, and the threaded part 64 are coaxially arranged along the central axis Oh of the head 30.

When the shaft of the head 30 is inserted into the fitting hole 132 at the distal end of the shank 20, the threaded part 64 of the head 30 is engaged into the threaded part 132a of the shank 20, and the shank 20 and the head 30 are joined, the fitting 62 of the head 30 is mated into the fitting hole 132 of the shank 20, and the distal end face of the shank 20 comes into contact with the boss 60 of the head 30. Thereafter, a key groove into which the two keys 106 are fitted is machined at the boundary between the shank 20 and the boss 60 by electric discharge machining or the like. The keys 106 are fitted so as to straddle the shank 20 and the boss 60, and portions of the keys 106 are welded to the boss 60. The keys 106 may comprise the oval keys 104, or rectangular keys 105 described above, or any other suitable shapes.

In the embodiments described above, the head 30 is joined to the shank 20 by mating. However, the present invention is not limited thereto, and as described below, joining may be carried out by mating the tip of the shank 20 with a hole in the central part of the head 30.

Figure 15:
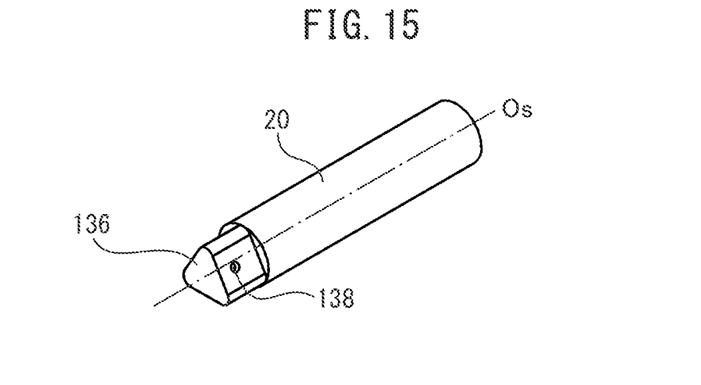
FIG. 15 is a perspective view of a shank according to yet another embodiment of the present invention.
Figure 16:
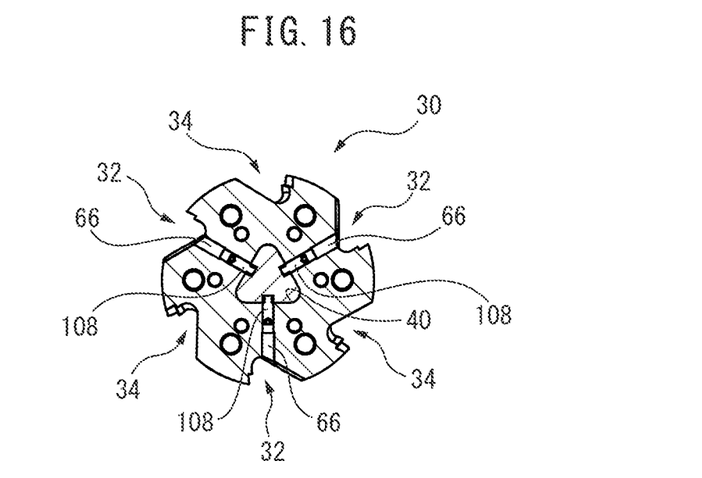
FIG. 16 is a cross-sectional view of a head attached to the shank of FIG. 15.
Figure 17:
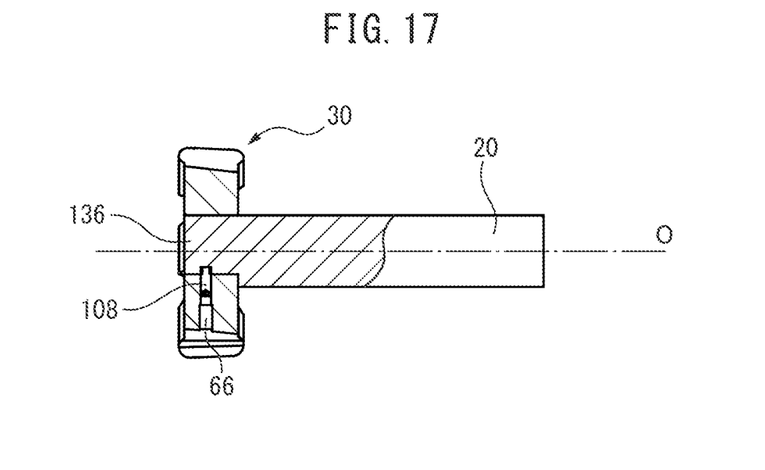
FIG. 17 is a partial longitudinal sectional view of the T-shaped tool of FIG. 16.

In yet another embodiment shown in FIGS. 15 to 17, the shank 20 has a triangular fitting 136 having a substantially triangular cross-section formed on the distal end thereof. A small hole 138 is formed on each side surface of the triangular columnar fitting 136. In the present example, the shank 20 is not provided with the flat surface 28.

Corresponding to the triangular columnar fitting 136 of the shank 20, a fitting hole 139 having a triangular cross section penetrating from the proximal end face 30a to the distal end face 30b is formed in the central part of the head 30. Furthermore, three screw holes 66 extending from the fitting hole 139 to the groove 34 in the radial directions are formed in the central part of the head 30.

The small holes 138 of the shank 20 and the screw holes 66 of the head 30 are arranged so as to be coaxial when the fitting 136 of the distal end of the shank 20 is fitted into the fitting hole 40 of the head 30. By screwing set screws 108 having pointed tips into the screw holes 66 and inserting the tips into the small holes 138 of the fitting 136, the head 30 is prevented from detaching from the shank 20. The fitting of the fitting 136 of the shank 20 and the fitting hole 139 of the head 30 can be interference fitting. The fitting 136 can be mated into the fitting hole 139 by heating the head 30 and shrink fitting. Furthermore, the set screws 108 are provided with anti-loosening measures.

The fitting of the tip of the shank 20 can be a polygonal prism shape other than the triangular columnar shape. For example, in yet another embodiment shown in FIGS. 18 to 20, the shank 20 has a fitting 140 having a substantially square cross-section formed at the distal end thereof.

Figure 18:
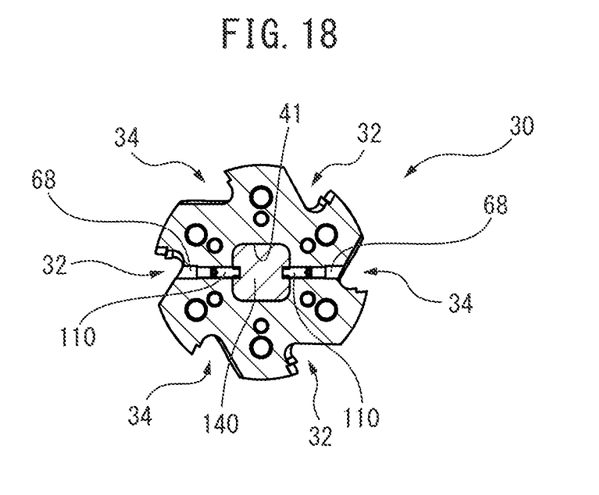
FIG. 18 is a perspective view of a shank according to yet another embodiment of the present invention.

The shank 20 has the fitting 140 having a substantially square cross-section formed at the distal end thereof. In the square columnar fitting 140, small holes 142 are formed on each of two opposing side surfaces. In the present example, the shank 20 is not provided with the flat surface 28.

Figure 19:
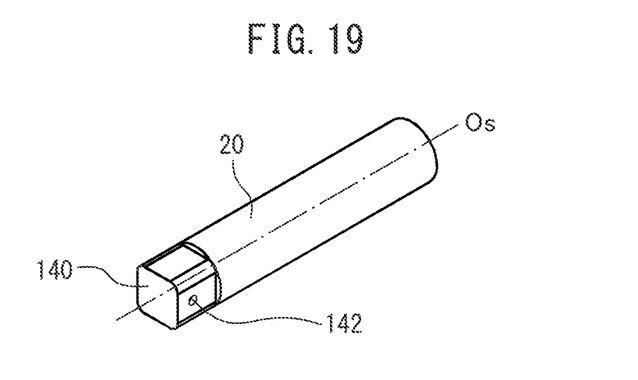
FIG. 19 is a cross-sectional view of a head attached to the shank of FIG. 18.
Figure 20:
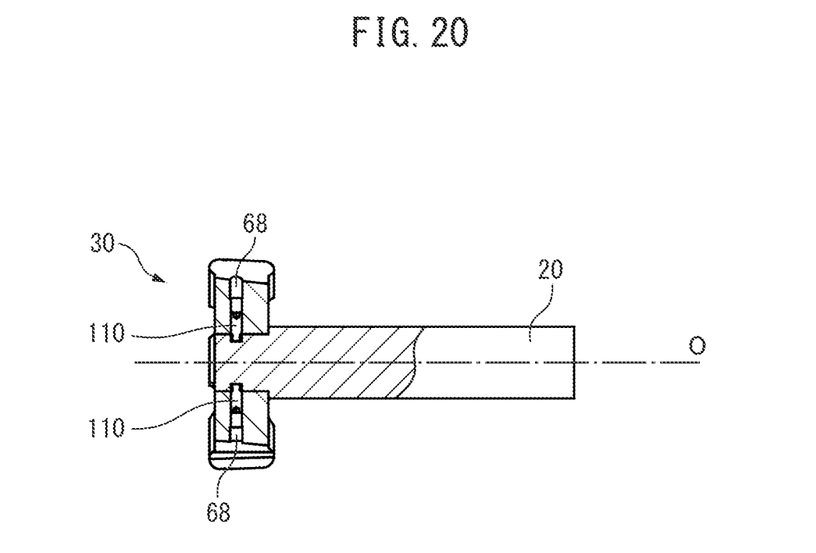
FIG. 20 is a partial longitudinal sectional view of the T-shaped tool of FIG. 19.

Corresponding thereto, a fitting hole 41 having a square cross-section is formed in the central part of the head 30 so as to extend from the proximal end face 30a to the distal end face 30b. Furthermore, two screw holes 68 extending radially from the fitting 140 of the shank 20 to the groove 34 are formed in the head 30.

The small holes 142 of the shank 20 and the screw holes 68 of the head 30 are arranged so as to be coaxial when the fitting 140 of the distal end of the shank 70 is mated in the fitting hole 41 of the head 30. By screwing set screws 110 having pointed tips into the screw holes 68 and inserting the distal ends thereof into the small holes 142 of the tiffing 140, detachment of the head 30 from the shank 20 can be prevented. The mating of the fitting 140 of the shank 20 and the fitting hole 41 of the head 30 can be interference fitting. The fitting 140 can be mated into the fitting hole 41 by heating the head 30 and shrink fitting. Furthermore, the set screws 110 are provided with anti-loosening measures.

In the embodiment of FIGS. 15 to 20, after the mating of the shank 20 into the fitting hole of the head 30, set screws having pointed tips are used to prevent separation between the shank 20 and the head 30. However, the present invention is not limited thereto, and a tapered piece may be interposed between the set screws and the shank 20.

Figure 21:
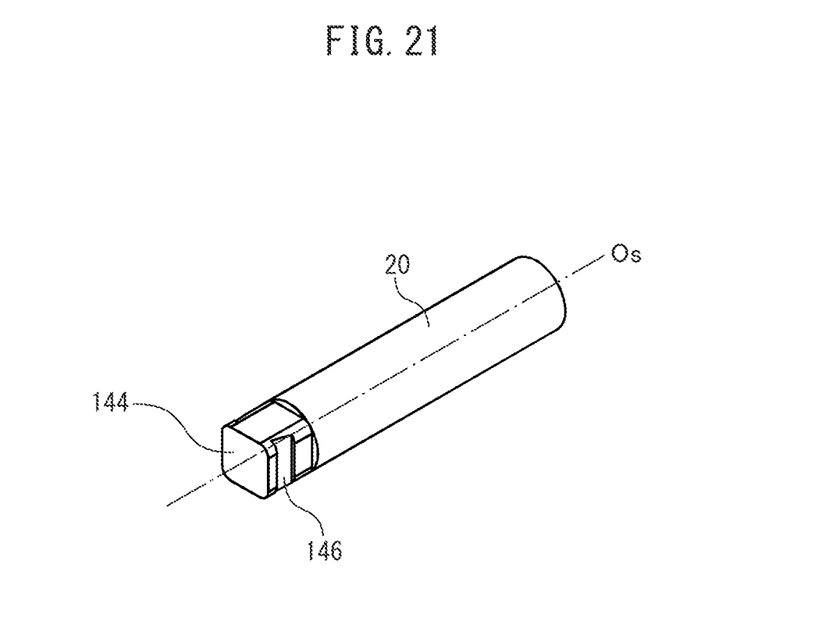
FIG. 21 is a perspective view of a shank according to yet another embodiment of the present invention.
Figure 22:
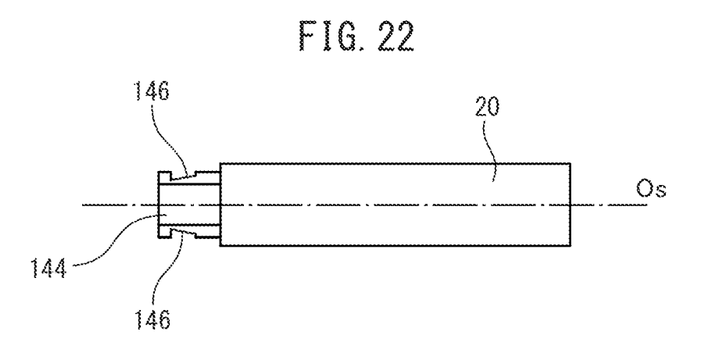
FIG. 22 is a side view of the shank of FIG. 21.
Figure 23:
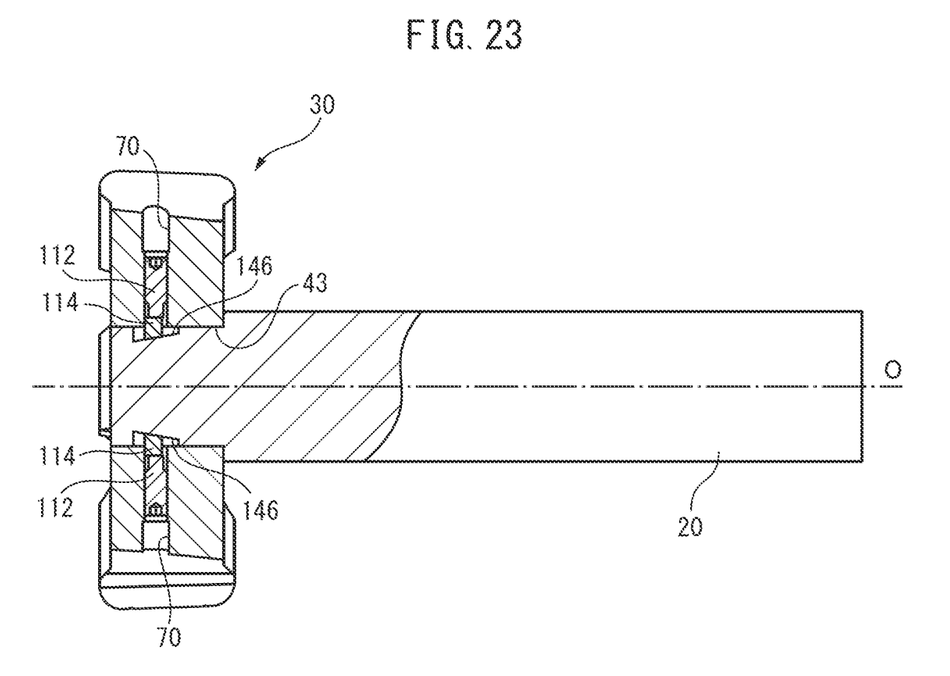
FIG. 23 is a partial longitudinal sectional view of a T-shaped tool in which a head is fastened on the shank of FIG. 21.

Referring to FIGS. 21 to 23, in yet another embodiment, the shank 20 has a fitting 144 having a substantially square cross-section formed at a distal end thereof. In the square columnar fitting 144, an inclined surface 146 formed of a plane inclined with respect to the central axis Os of shank 20 is formed on each of the two opposing side surfaces. The inclined surfaces 146 are formed in a tapered shape so as to approach each other in the tip direction of the shank 20. In the present example, the shank 20 is not provided with the flat surface 28.

Corresponding thereto, a fitting hole 43 having a square cross-section is formed in the central part of the head 30 so as to penetrate from the proximal end face 30a to the distal end face 30b. Furthermore, two screw holes 70 extending radially from the fitting 144 of the shank 20 to the groove 34 are formed in the head 30.

The screw holes 70 of the head 30 are arranged so as to face the inclined surfaces 146 of the shank 20 when the fitting 144 of the distal end of the shank 20 is fitted into the fitting hole 43 of the head 30. As shown in FIG. 23, after tapered pieces 114 are inserted into the screw holes 70, set screws 112 are screwed into the screw holes 70 to press the tapered pieces 114 against the inclined surfaces 146. This prevents the head 30 from detaching from the shank 20. The mating of the fitting 140 of the shank 20 and the fitting hole 41 of the head 30 can be interference fitting. The fitting 140 can be mated into the fitting hole 41 by heating the head 30 and shrink fitting. In addition, the set screws 112 are provided with anti-loosening measures.

According to the present embodiment, the T-shaped tool is produced by performing fastening of the shank 20 and the head 30 by screw engagement, interference fitting or shrink-fitting of polygonal prism and polygonal holes in this manner, and welding the key to the head 30 after key coupling, or after set screw connection, treating the set screws to prevent loosening. The fastening between the shank 20 and the head 30 is not released after the T-shaped tool is produced, the joint rigidity is high, whereby there is no risk that the fastening between the shank 20 and the head 30 will release during machining. Furthermore, by forming the shank 20 from cemented carbide (having a Young's modulus approximately three times that of steel), the shank 20 is less likely to become deformed, whereby machining accuracy can be improved.

As compared to a T-shaped tool in which the shank and the head are monolithic, in which the shank and the head are cut into a T shape from one cemented carbide, according to the present embodiment, material cost and manufacturing cost can be significantly reduced. Furthermore, in the present embodiment, since the head is finished with respect to the shank after the shank and head are fastened, unlike Patent Literature 1, it is not necessary to specially manufacture reference surfaces via which the shank and the head come into contact with each other or affixation screws, whereby manufacturing cost can be reduced.

REFERENCE SIGNS LIST

10 T-Shaped Tool
20 Shank
24 Male Thread
30 Head
31 Cover
36 Upper Insert
38 Lower Insert
42 Screw Hole
44 Screw Hole

50 Female Thread
54 Radial Groove
105 Key
126 Recess

The invention claimed is:

1. A T-shaped tool in which a tool body having a cutting edge and a cylindrical shank are fastened in a T shape in a side view, wherein
   the shank is composed of a cemented carbide and has a male or female thread which engages with a female or male thread of the tool body on a distal end thereof,
   the tool body is composed of a steel material and has the female or male thread which engages with the male or female thread of the shank, and
   a key fitted between the shank and the tool body, the shank and the tool body being coupled to each other to prevent the shank and the tool body from rotating relative to and separating from each other.

2. The T-shaped tool according to claim 1, wherein the key is welded to the tool body after the key is fitted.

* * * * *